March 12, 1963 W. K. WESTMIJZE 3,081,382

TRANSVERSELY SCANNING TRANSDUCER WITH FIXED ELECTROMAGNET AND MOVING POLE PIECES

Filed July 21, 1954

INVENTOR
WILLEM KLAAS WESTMIJZE

BY [signature]

AGENT

United States Patent Office 3,081,382

Patented Mar. 12, 1963

3,081,382

TRANSVERSELY SCANNING TRANSDUCER WITH FIXED ELECTROMAGNET AND MOVING POLE PIECES

Willem Klaas Westmijze, Eindhoven, Netherlands, assignor, by mesne assignments, to North American Philips Company, Inc., New York, N.Y., a corporation of Delaware Filed July 21, 1954, Ser. No. 444,850

Claims priority, application Netherlands Sept. 2, 1953

6 Claims. (Cl. 179—100.2)

Figure 1:
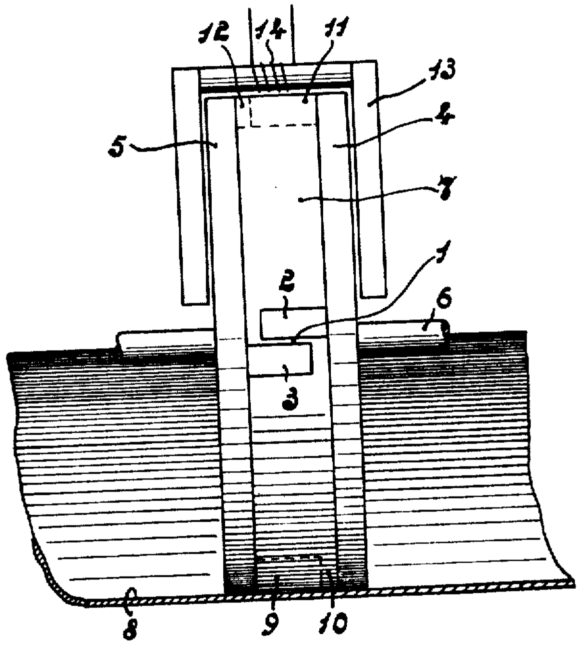

This invention relates to magnetic recording and reproducing heads.

In the process of recording or reproducing in a device for recording or reproducing magnetic information, it is naturally necessary to cause the magnetic head and the carrier on which the magnetic information is or is to be recorded to effect a movement relatively to one another. The carrier may, for example, be made to move along a stationary magnetic head, as is usual. However, it is also possible to cause the magnetic head to move along a carrier which may or may not move during the recording or reproducing process. The latter possibility is preferred in the case of, for example, transverse scanning of a tape-shaped carrier to which the information is applied as successive lines transverse to the carrier. In this case the effective or active gap of the magnetic head moves through a substantially closed, for example circular, course during which, at least during part of which, the effective gap of the magnetic head on the one hand and the carrier on the other are in contact with one another, as is required for the said process. The term "effective or active gap of the magnetic head" as used herein is to be understood to mean the discontinuity of the magnetic circuit produced by the ends of the pole pieces of the core.

The electric potential produced at the ends of the magnetic head signal-carrying winding moving with the magnetic circuit must either be taken from the recording amplifier or be supplied to the reproducing amplifier. Insofar as the amplifier forms part of the stationary part of the device, this consequently means that the said electric potential has to be transmitted from a moving to a stationary part of the device or vice versa. This might in this case be effected, for example, by the use of an electric collector, in which case the moving part of the device should have to be provided with slip rings. This has a limitation in that there is a likelihood of disturbances due to discontinuities of the passage of current, the more so as the electric potentials produced at the ends of the magnetic head winding are very weak. In order to obviate the disadvantage attendant on the transmission of small electric potentials it might be possible to cause the amplifier to follow the movement, but this in turn has a limitation in that, neglecting the mass of the moving part of the device, the amplifier tubes must be supplied from stationary sources and consequently various potentials must be transmitted.

In order to avoid these difficulties, the magnetic head according to the invention comprises a rotary part provided with one or more effective gaps and a stationary part carrying the magnetic head winding and embracing the first part with the formation of an air space in a manner such that the two parts together form the circuit for the magnetic flux.

In a particular embodiment for use with a carrier or magnetizable tape of curved cross-section, the magnetic head according to the invention comprises two discs made of magnetic material adapted to rotate about a common shaft, fixed with respect to one another, and arranged opposite each other slightly spaced away from one another, on each of which in the intermediate space produced between them pole pieces are arranged such that each pair of adjacent pole pieces of each disc forms the effective air gap and that the stationary part embraces the discs shaped in the form of a U-shaped yoke.

In the case of a flat carrier or magnetizable use is preferably made of a magnetic head the rotating part of which comprises a disc and a ring made of magnetic material which are fixed relatively to each other so as to be coaxial and are slightly spaced away from each other, pole pieces being arranged not only on the disc but also on the ring in the intermediate space produced by them in a manner such that each pair of adjacent pole pieces forms the effective air gap and that the stationary part embraces the discs as a U-shaped yoke.

In view of the losses occurring at high frequencies the pole pieces and their supports and/or the U-shaped yoke are preferably made of a suitable soft magnetic ferrite material, for example the one known under the name of Ferroxcube.

Figure 2:
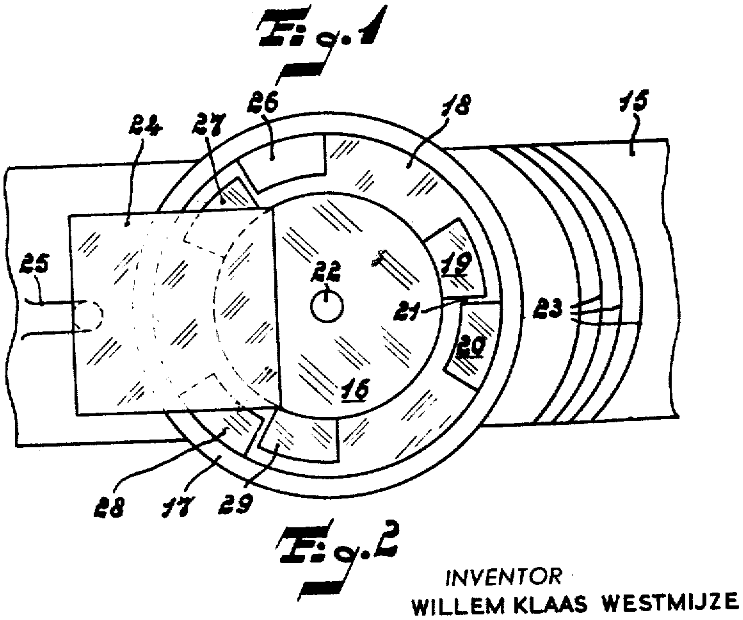

The invention will now be explained with reference to the accompanying drawing in which two embodiments are shown by way of example, and in which:

FIG. 1 shows a magnetic head according to the invention for use with a magnetizable carrier of circular cross-section, and FIG. 2 is a side view of a magnetic head for reproducing or recording magnetic information on a flat carrier.

In FIG. 1, an effective or active gap 1 is produced by two pole pieces 2 and 3 each arranged on a circular disc 4 and 5, respectively, made of magnetic material, adapted to rotate about a common shaft 6 and arranged opposite each other slightly spaced away from each other and fixed or coupled relatively to each other by means of, for example, a polyester resin 7. In the intermediate space produced between the discs 4 and 5 and filled with the fixing means 7 the pole pieces 2 and 3 are arranged such that the effective gap produced by them is situated at the circumference of the disc and thus is enabled to come into the contact required for recording or reproducing magnetic information with the tape-shaped carrier 8 shown in longitudinal section. During the recording or reproducing process the effective gap 1 will move in a closed circular course transverse to the carrier and with which a channel-shaped or half-cylindrical carrier 8 is made to conform in that its section at right angles to the direction of its length forms part of a circle. When these line-shaped recordings are scanned, it will be necessary to cause the carrier or tape and the magnetic head to move relatively to each other in the direction of length of the carrier, and in accordance with the relative spacing of the lines. In addition, with a view to the discontinuity of the reproduction it is desired for the magnetic head in the form shown of a rotatable wheel to comprise a plurality of effective gaps in a manner such that when one gap leaves the carrier, another one at the other side of the carrier takes over the recording or reproducing without interruption. Thus, FIG. 1 shows not only the pair of pole pieces 2, 3 but also the pairs 9, 10 and 11, 12 which are staggered relatively to the first pair through an angle of 90°.

The stationary part of the device is an electromagnet constituted by a U-shaped yoke 13 made of magnetic material on which the magnetic head signal-carrying winding 14 is wound. The yoke 13 embraces the two discs 4 and 5 with the formation of an air space and thus constitutes as it were a magnetic collector since the magnetic flux produced at the effective gap or gaps during playback will be transmitted during the rotation of the discs via these discs to the yoke 13 and will then pass through the winding 14. However, this will be effected only if the magnetic resistance of the back circuit described is small as compared with that of the front circuit, that is the parallel connected effective gaps. In spite of the fact that the distance by which the discs 4, 5 and the yoke 13 are spaced apart must be much greater than the size of the effective gap 1, which is of the order of a few microns, with a view to their relative movement, it is possible for the abovementioned condition to be satisfied, since the contact area of the yoke and the discs largely exceeds that of the pole pieces. During the recording process, flux generated by the electromagnet is carried via the discs 4 and 5 and the pole pieces 2 and 3 to the active gap 1, as well as to the other active gaps, and crosses the active gap 1 in a direction perpendicular to the pole piece surfaces defining the gap and parallel to the direction in which the gap is moving, which is at right angles to the direction in which the tape 8 is moved, producing longitudinal recording.

In FIG. 2 the rotary part of the magnetic head for use with a flat carrier 15 consists of a disc 16 and a ring 17 both made of magnetic material. The disc and the ring are fixed or coupled coaxially relatively to each other by means of a fixative 18, for example a polyester resin. In the intermediate space between the disc and the ring pole pieces 19 and 20 are arranged so as to form the effective gap 21. When the disc and the ring rotate about the common shaft 22 the effective gap 21 will be able to come into contact with the tape-shaped carrier 15 which must move relatively to the magnetic head in the direction of its length. Thus, the information recorded on the carrier will be shaped in the form of curved lines, a few of which are shown diagrammatically at 23. The U-shaped yoke 24 of the electromagnet is shown in plan view and embraces the disc 16 and the ring 17 and moreover has a signal-carrying winding 25 wound on it. In addition, not only the pair of pole pieces 19, 20 but also pairs 26, 27 and 28, 29 are arranged in the space between the disc and the ring for the continuity of reproduction, the two last-mentioned pairs being staggered relatively to the first pair through an angle of 120°.

What is claimed is:

1. A magnetic head for recording or reproducing magnetic information comprising a stationary magnetic portion and a rotatable magnetic portion, a signal-carrying winding on said stationary portion; said rotatable portion comprising a pair of coaxial spaced opposed mechanically coupled magnetic discs, a plurality of pole members mounted in spaced positions along the periphery of the discs and in the space between the discs, each pole member on one disc being adjacent a pole member on the other disc and forming therewith an active gap; said stationary member including a substantially U-shaped magnetic member surrounding a substantial portion of the coupled discs and adjacent thereto but spaced therefrom for magnetically coupling the winding to the rotatable portion.

2. A magnetic head as set forth in claim 1 wherein the overall reluctance of the circuit comprising the stationary magnetic portion and its magnetic coupling to the movable magnetic portion is substantially below that of the circuit formed by the latter.

3. The combination with a traveling magnetizable tape, of a magnetic head for recording or reproducing magnetic information comprising a stationary magnetic portion and a rotatable magnetic portion, a signal-carrying winding on said stationary portion; said rotatable portion comprising a pair of mechanically coupled concentric magnetic members having an intermediate annular space therebetween, a plurality of pole members mounted in spaced positions along the periphery of the concentric members and projecting within the annular space, each pole member on one concentric member being adjacent a pole member on the other concentric member and forming therewith an active gap, means for rotating the concentric magnetic members to move the pole pieces across the tape substantially at right angles to the path of travel of said tape and in a direction perpendicular to the active gap, said stationary member including a substantially U-shaped magnetic member surrounding a substantial portion of the coupled concentric members and adjacent thereto but spaced therefrom for magnetically coupling the winding to the rotatable portion to create magnetic flux across the active gap in directions parallel to the movement of the gap while the latter is traversing the tape.

4. The combination with a traveling magnetizable tape, of a pair of pole pieces providing a gap between their ends, means for moving the pole pieces across the tape at right angles to the path of travel of said tape and in a direction perpendicular to the ends of the pole pieces forming the gap between them so that the gap traverses a narrow transverse area of the tape, and a fixed electromagnet located so as to create magnetic flux through the pole pieces and across the gap in directions parallel to the movement of the gap while the gap is traversing the tape.

5. The combination with a traveling magnetizable tape a part of which forms a cylindrical surface whose axis is parallel to the tape and spaced therefrom, of a wheel located in a plane perpendicular to the tape and at right angles to the path of travel of said tape and rotatable about said axis with its periphery close to the cylindrical part of the tape, a plurality of pole pieces forming gaps and secured about the periphery of the wheel so that rotation of the wheel carries them successively across the cylindrical portion of the tape, and stationary means for causing a magnetic flux through each pair of pole pieces while its gap is traversing the tape, said flux traversing the gap in directions parallel to the direction of travel of the gap.

6. The combination with a traveling magnetizable tape, of a rotatable wheel, said wheel comprising plural mechanically connected members of magnetic material each having projecting therefrom plural spaced pole pieces which pass close to the tape when the wheel is rotated, each pole piece of one wheel member forming with a pole piece of the other wheel member an active gap, whereby rotation of the wheel causes the active gaps successively to traverse the tape, and a stationary electromagnet including magnetically conductive members extending alongside, close to but spaced from each of the rotatable wheel members for magnetically coupling together by a circuit of low reluctance the stationary electromagnet to the pole pieces forming the active gaps via the rotatable magnetic wheel members of magnetic material.

References Cited in the file of this patent

UNITED STATES PATENTS

| | | |
|---|---|---|
| 2,188,650 | Clark | Jan. 30, 1940 |
| 2,423,339 | Newman | July 1, 1947 |
| 2,560,474 | Potts | July 10, 1951 |
| 2,743,318 | De Forest | Apr. 24, 1956 |
| 2,750,449 | Thompson et al. | June 12, 1956 |
| 2,771,505 | Avery | Nov. 20, 1956 |
| 2,909,616 | Marty | Oct. 20, 1959 |

UNITED STATES PATENT OFFICE

CERTIFICATE OF CORRECTION

Patent No. 3,081,382 March 12, 1963

Willem Klaas Westmijze

It is hereby certified that error appears in the above numbered patent requiring correction and that the said Letters Patent should read as corrected below.

Column 2, line 6, after "magnetizable" insert -- tape, --.

Signed and sealed this 8th day of October 1963.

(SEAL)
Attest:

ERNEST W. SWIDER
Attesting Officer

EDWIN L. REYNOLDS
Acting Commissioner of Patents